US012792325B2

(12) United States Patent
Takahashi et al.

(10) Patent No.: US 12,792,325 B2
(45) Date of Patent: Nov. 10, 2026

(54) PARALLEL EXECUTION OF CELLS IN DIRECTED ACYCLIC GRAPH-DRIVEN NOTEBOOK ENVIRONMENT

(71) Applicant: Hex Technologies Inc., San Francisco, CA (US)

(72) Inventors: Glen Takahashi, San Jose, CA (US); Caitlin Royden Colgrove, San Francisco, CA (US); Dylan Mccoy Scott, Olympia, WA (US)

(73) Assignee: Hex Technologies Inc., San Francisco, CA (US)

( * ) Notice: Subject to any disclaimer, the term of this patent is extended or adjusted under 35 U.S.C. 154(b) by 290 days.

(21) Appl. No.: 18/622,729

(22) Filed: Mar. 29, 2024

(65) Prior Publication Data

US 2025/0306880 A1 Oct. 2, 2025

(51) Int. Cl.
*G06F 8/41* (2018.01)
*G06F 8/34* (2018.01)

(52) U.S. Cl.
CPC ................ *G06F 8/445* (2013.01); *G06F 8/34* (2013.01); *G06F 8/443* (2013.01)

(58) Field of Classification Search
CPC . G06F 8/34; G06F 8/433; G06F 8/443; G06F 8/445
See application file for complete search history.

(56) References Cited

U.S. PATENT DOCUMENTS

| | | | | |
|---|---|---|---|---|
| 6,832,370 | B1 * | 12/2004 | Srinivasan | G06F 8/4452 712/241 |
| 6,931,635 | B2 * | 8/2005 | Inagaki | G06F 8/445 717/133 |
| 8,214,831 | B2 * | 7/2012 | Eichenberger | G06F 8/445 718/100 |
| 10,157,055 | B2 * | 12/2018 | Tamir | G06F 8/433 |
| 11,860,766 | B2 * | 1/2024 | Subotić | G06F 11/3624 |
| 12,045,239 | B1 * | 7/2024 | Takahashi | G06F 16/2455 |
| 12,332,931 | B2 * | 6/2025 | Bischof | G06F 8/30 |

* cited by examiner

*Primary Examiner* — Marina Lee
(74) *Attorney, Agent, or Firm* — Fenwick & West LLP

(57) ABSTRACT

A system performs parallel execution of a sequence of cells of a notebook. The system generates a directed acyclic graph of nodes and edges, where the nodes correspond to cells and edges represent dependencies between cells. The system determines edges between cells based on factors including whether a cell is unsafe for parallelization. The system executes the cells in an order determined by the directed acyclic graph. The system executes a plurality of cells in parallel if the cells are independent of each other, i.e., each cell is unreachable from the remaining cells of the plurality of cells by following edges of the directed acyclic graph.

20 Claims, 15 Drawing Sheets

600

500

PARALLEL EXECUTION OF CELLS IN DIRECTED ACYCLIC GRAPH-DRIVEN NOTEBOOK ENVIRONMENT

TECHNICAL FIELD

Aspects of this disclosure generally relate to execution of cell-driven notebooks and more specifically to parallel execution and optimized execution of cells in a directed acyclic graph driven notebook environment.

BACKGROUND

A system provides an interactive development environment for users, for example, a web-based interactive computing platform. Users interact with the system using a client device to interactively develop documents including code using programming languages such as Python or database query languages such as the structured query language (SQL). The code provided by user may be complex and may involve computation intensive operations or input/output (I/O) intensive operations such as file read/write operations. Furthermore, the code may cause interactions with external systems such as web services that may be slow or cause the execution to hang indefinitely. A cell of the notebook that has slow performance or blocks on certain call slows the execution of entire notebook. This provides poor user experience and may consume significant processing resources.

SUMMARY

A system performs parallel execution of cells of a notebook. The system may be an online system or operate in an offline mode. The system receives a sequence of cells of a notebook. The cells of the sequence may include executable code, for example, code specified using programming languages such as Python or database query languages such as the structured query language (SQL). The system generates a directed acyclic graph of nodes and edges, where the nodes correspond to cells and edges represent dependencies between cells.

The system generates the directed acyclic graph by identifying dependencies between cells. According to an embodiment, the system identifies a subsequence of cells and determines whether a particular cell from the subsequence is unsafe for parallelization. If the system determines that the particular cell is unsafe for parallelization, the system introduces at least one of (1) an edge from a cell of the subsequence that occurs before the particular cell to the particular cell, or 2) an edge from the particular cell to a cell of the subsequence that occurs after the particular cell.

The system executes the cells in an order determined by the directed acyclic graph. The system executes a plurality of cells in parallel if the cells of the plurality of cells are independent of each other, i.e., each cell is unreachable from the remaining cells of the plurality of cells by following edges of the directed acyclic graph.

According to an embodiment, a cell is determined unsafe for parallelization if the executable code of the cell comprises one or more of insert, update, delete, or an alter table operation.

According to an embodiment, the system stores a list of functions determined to be unsafe for parallelization and determines that the particular cell is unsafe for parallelization if the particular cell invokes a function from the list of functions.

According to an embodiment, the system dynamically updates the directed acyclic graph if the user modifies the code of the cells. The system receives a request to modify code of a particular cell. Responsive to the cell being modified, the system determines changes to inputs and outputs of the particular cell based on modification of the particular cell. The system modifies the directed acyclic graph based on the changes to inputs and outputs of the particular cell, the modifying causing one or more of: adding a new edge or deleting an existing edge. If subsequent requests to execute a cell are received the system traverses the modified directed acyclic graph to identify the set of cells for execution of the cell.

According to an embodiment, the system performs pruning of cells by excluding certain cells from execution while evaluating a particular cell. The system may transform code of a target cell to include code of one or more source cells. For example, assume that there is an edge from cells C1 and C2 to cell C3 and cells C1 and C2 include database queries Q1 and Q2 respectively, and cell C3 includes a database query Q3 that joins queries Q1 and Q2. The query Q3 may refer to queries Q1 and Q2 by an identifier, for example, a query name. In this case, the system may modify the query Q3 to include the definition (or code) of the queries Q1 and Q2 rather than their identifiers. Accordingly, the code of the queries Q1 and Q2 is in-lined into the query Q3. For several queries, this results in improvement of the performance of the resulting query Q3 since the query compiler is better able to optimize the query since the resulting query includes all the information needed to optimize it. The optimized query executes more efficiently, for example, in terms of computation or storage.

According to an embodiment, the user interface displaying the notebook allows users to execute the entire notebook or identify a specific cell for execution. Accordingly, the system receives a request to execute at least a portion of the notebook, for example, a request to execute a cell of the notebook. In response to the request, the system identifies a subset of cells of the sequence for execution based on the directed acyclic graph. The subset of cells including precedent cells from which the cell depends.

The system performs pruning of the subset of cells by determining whether a source cell can be excluded from execution of the notebook based on properties of the source cell. For example, the system may determine that a source cell cannot be excluded from execution of the notebook if the source cell generates a dataframe processed by a second target cell. Similarly, system may determine that a source cell cannot be excluded from execution of the notebook if the source cell includes code that performs a mutation operation that changes the state of the program represented by the notebook. If the system determines that the source cell can be excluded, the system executes the subset of cells without the source cell. Pruning cells from the execution improves the efficiency of execution, for example, computational efficiency or memory efficiency and allows the target cell obtained by composing source cells to be optimized.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
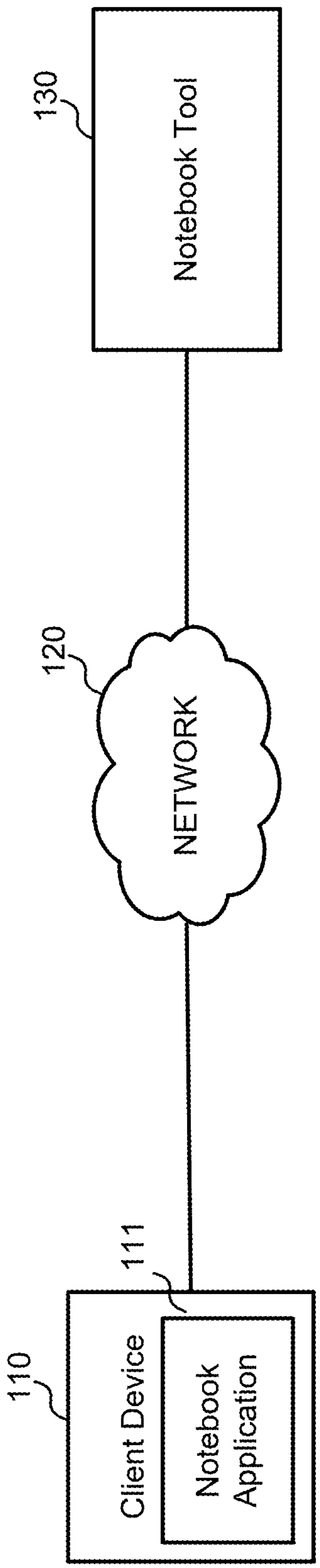
FIG. 1 illustrates one embodiment of a system environment for implementing a notebook tool.

A system according to various embodiments provides an interactive development environment for building documents that include executable codes along with non-executable content such as text, images, videos, and so on. The interactive development environment allows users to configure and arrange workflows using documents for various fields such as data science, scientific computing, computational journalism, machine learning, and so on. The interactive development environment allows users to prototype and explain executable code, explore and visualize data, and share ideas with other users. Accordingly, the interactive development environment allows users to develop, document, execute code, as well as communicate the results and share the code. The interactive development environment may be a web-based application configured by an online system but may also operate in an offline fashion.

The interactive development environment can be used to develop documents referred to as notebooks. A notebook represents a shareable document that combines computer code, plain language descriptions, data, visualizations like 3D models, charts, mathematics, graphs and figures, and interactive controls. The executable code is embedded using cells within the document. Accordingly, a notebook includes a sequence of cells. The system allows users to input a cell using a text widget, for example, a multiline text input field that allows users to input executable instructions as well as execute them.

The system according to various embodiments analyzes cells of a notebook to optimize execution of the notebook. More specifically, the system parallelizes execution of cells of a notebook to the extent possible. The system composes code from multiple cells to generate cells that are easier to optimize for execution efficiency. The system also eliminates execution of certain cells if possible. Accordingly, the embodiments improve the efficiency of execution of notebooks. This results in improved user experience for users developing and executing the notebooks.

Embodiments include computer implemented methods for performing the processes described herein. Embodiments include non-transitory computer-readable medium comprising memory with instructions encoded thereon that, when executed, cause one or more computer processors to perform operations representing steps of the method disclosed herein.

Embodiment include computer systems comprising one or more computer processors and non-transitory computer-readable media comprising memory with instructions encoded thereon that, when executed, cause the one or more computer processors to perform operations representing steps of the method disclosed herein.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure (FIG. 1 illustrates one embodiment of a system environment for implementing a notebook tool. As depicted in FIG. 1, environment 100 includes client device 110 with notebook application 111 installed thereon, network 120, notebook tool 130, and generative AI service 140. Client device 110 may be any device having a user interface useable to interact with a notebook via notebook application 111 and/or notebook tool 130. Exemplary client devices may include personal computers, laptops, tablets, smartphones, and so on. While only one client device 110 is depicted, any number of client devices may be used. Multiple client devices may be used at a same time to access and otherwise collaborate on a same notebook.

Notebook application 111 may be a dedicated application installed on client device 110 for using a notebook. Notebook application 111 may be installed directly or indirectly from notebook tool 130 (e.g., downloaded from notebook tool 130; downloaded from an application store; from a hard drive having installation code, and so on). The notebook may in whole or in part be stored in the cloud (e.g., using notebook tool 130) and/or local to client device 110. Notebook application 111 may be a browser through which a notebook may be accessed from notebook tool 130. The term notebook, as used herein, may refer to an application that accepts inputs in any number of code languages (e.g., python, SQL (Structured Query Language), Jupyter, and so on) and/or non-code languages (e.g., spreadsheet format, text format, etc.) and/or other UI-based operations (e.g., interacting with a UI to generate a pivot table, to create boolean filters to filter a data set, or to perform any other activity, where the interaction causes the notebook to automatically generate code to perform needed activities or computations). The inputs may each form individual cells, or may command combinations of inputs that together form cells. Cells may be connected in a DAG structure, with directed edges pointing between one another that reflect dependencies among cells. The DAG structure and further details about notebook operation are discussed in further detail with reference to FIGS. 2-6.

Network 120 may be a data communication channel between client device 110 and notebook tool 130. The data communication channel may be any channel usable to transmit communications between these entities, such as the Internet, a local area network, a wireless network, a short-range communications network, and so on. Network 120 may facilitate communication between any number of client devices and external servers and services beyond those depicted in environment 100.

Notebook tool 130 may be a cloud-based provider that stores notebooks and provides functionality described herein with respect to notebooks. All functionality described herein with respect to notebook application 111 may be performed by notebook tool 130, and all functionality described herein with respect to notebook tool 130 may be performed by notebook application 111. Distributed processing where some activity described is performed by notebook application 111 and other activity described is performed by notebook tool 130 is implied as within the scope of what is described even where processing is only described with respect to one of the two entities herein. Further details about the functionality of notebook tool 130 are described below with respect to FIG. 2.

Figure 2:
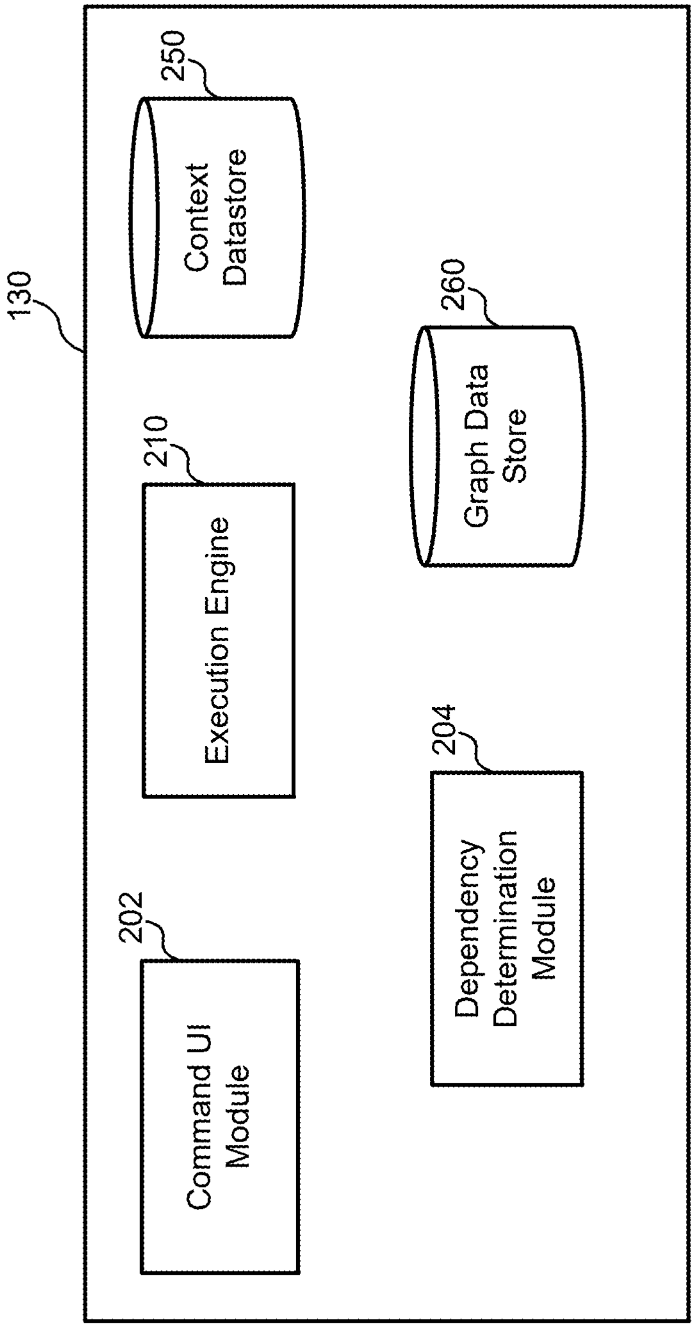
FIG. 2 illustrates one embodiment of modules of the notebook tool.

FIG. 2 illustrates one embodiment of modules of the notebook tool. As depicted, notebook tool 130 includes command UI (user interface) module 202, dependency determination module 204, context module 206, context datastore 250, and graph data store 260. The modules and datastores depicted in FIG. 2 are merely exemplary; any number of modules and/or datastores may be used to achieve the functionality disclosed herein. Moreover, as mentioned above, while the modules and datastore are illustrated and described with respect to notebook tool 130, some or all of the operation of these modules and/or datastores may part of notebook application 111 operating on client device 110, thus accommodating on-device operation in whole, or distributed processing between notebook application 111 and notebook tool 130.

Figure 3:
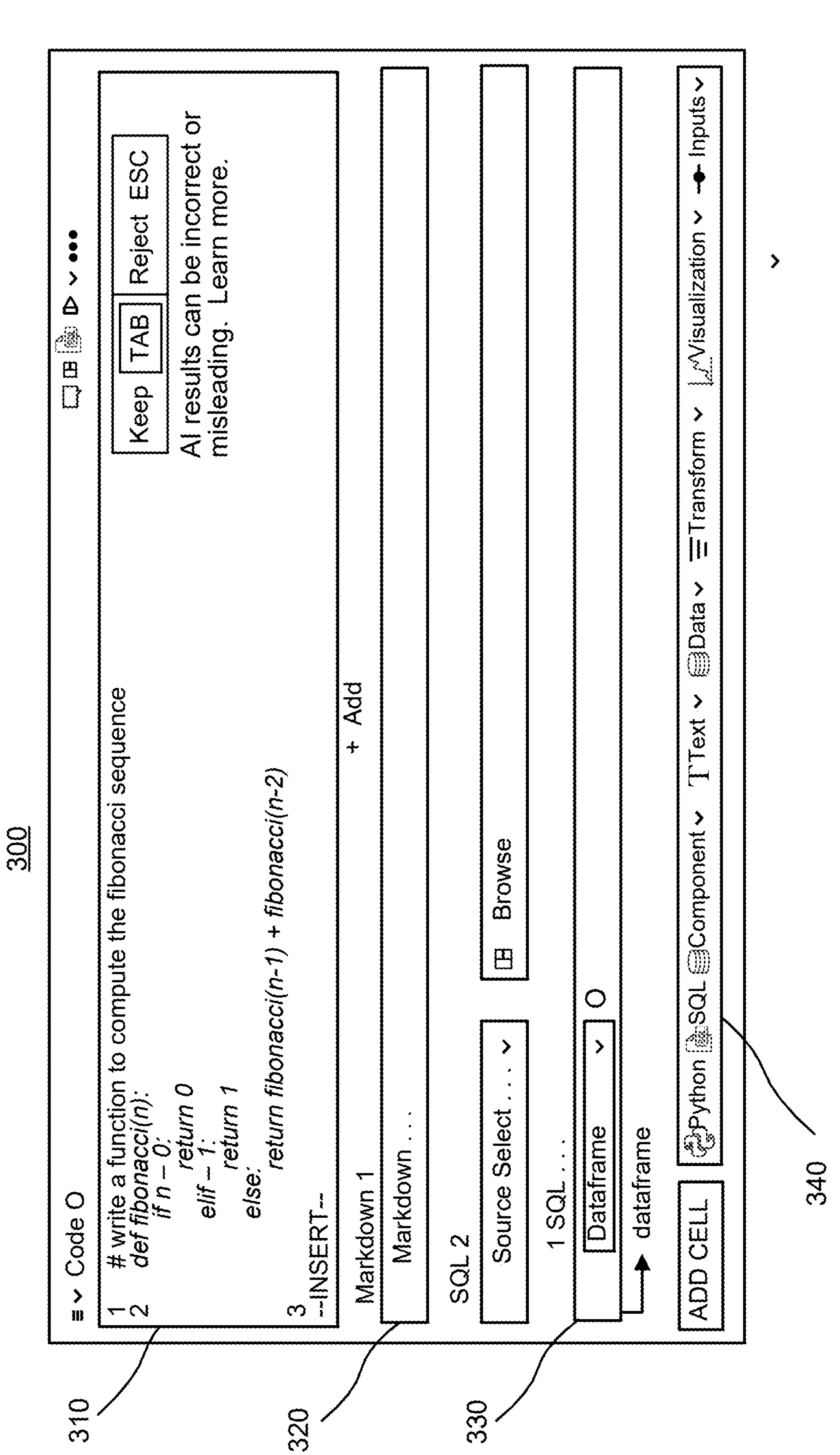
FIG. 3 illustrates an exemplary user interface for generating a cell using generative AI, in accordance with an embodiment.

Command UI module 202 receives inputs in cells of a notebook. Turning for the moment to FIG. 3, FIG. 3 illustrates an exemplary user interface for generating a cell using generative AI, in accordance with an embodiment. FIG. 3 also illustrates a user interface for generating a cell in other manners. As shown in FIG. 3, user interface 300 includes multiple cells each having their own interface, where interface 310 is for generating code, interface 320 is for generating markdown (e.g., tables, text, etc.), and interface 330 is for generating SQL. These are merely exemplary; any number of cells may be generated or part of user interface 300, and the cells may use any language (other code languages like Python, natural language, spreadsheet, or any other language is within the scope of the disclosure).

Cells may be generated from scratch or may be generated using pre-existing components. To use pre-existing components, component option 340 may be selected, which may lead to a library of components. A user may select from the library a component, and responsive to doing so, command UI module 202 will add the component as a cell to user interface 300. To generate cells from scratch, in an embodiment, a user may add text to the cell's associated interface (e.g., manually type code, SQL, markdown, python, and so on).

Figure 4:
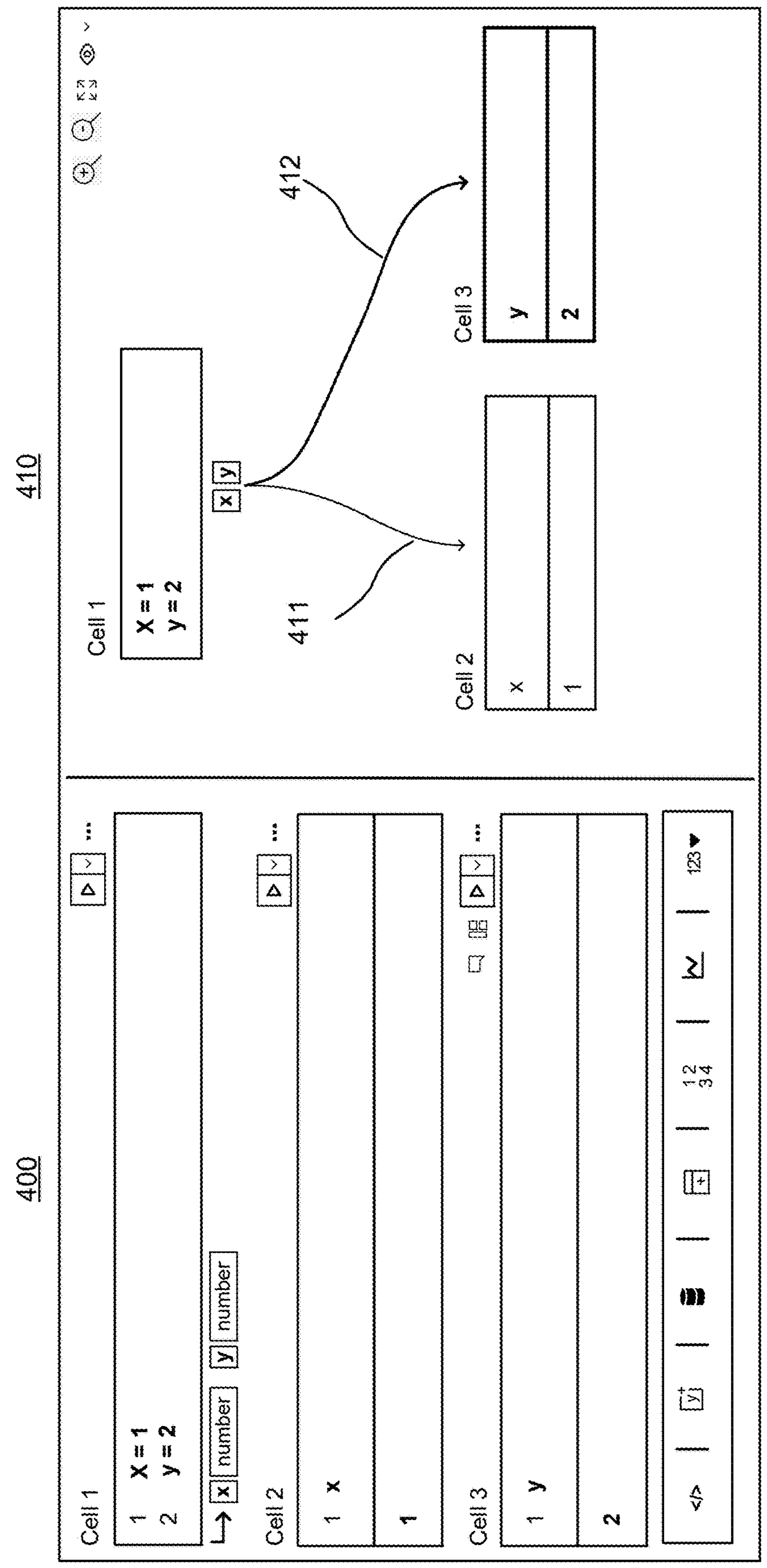
FIG. 4 illustrates exemplary cells and an exemplary graph representing those cells.

To illustrate graph dependencies in a DAG used by notebook tool 130, we turn to FIG. 4. FIG. 4 illustrates exemplary cells and an exemplary graph representing those cells. User interface 400 shows cell 1, which defines x=1 and y=2. Cell 2 has a value of x. Cell 3 has a value of y. Notebook tool 130 automatically determines dependencies of cell 2 and cell 3 to cell 1, because the values of variables in those cells are defined in cell 1. Accordingly, shown in graph 410, notebook tool 130 generates directed edge 411 between cell 1 and cell 2, and directed edge 412 between cell 1 to cell 3, the directed edges each pointing downward because the dependency flow goes downward from cell 1. That is, whenever cell 1 has a value that changes in x or y, the corresponding directed edge causes notebook tool 130 to responsively recalculate ells 2 and/or 3 (depending on which of x, y, or both is updated) to update those values.

In order to successfully implement a DAG structure in a notebook environment, all directed edges between cells must flow in only one direction (to prevent an infinite loop). For example, a DAG is broken in a scenario where a notebook has a first cell that defines a=1 and b=a+1, and a next cell that defines b=1, and a=b+1, because the cells are interdependent. To avoid an infinite loop in such a scenario, notebook tool 130 employs linear ordering, where whichever cell is introduced first in the notebook controls, and backward-looking edges are removed. Thus, in the prior example, a directed edge would be drawn from the first cell to the next cell, and no directed edge would be drawn back to the first cell from the next cell (or if such an edge were to exist, it would be removed).

In order to successfully implement a DAG structure in a notebook environment, the ordering must be deterministic. For example, consider a scenario where there are two cells that each define a variable X. The first cell defines X=1, and the second cell defines X=2. A function of print (X) appears in a third cell. For the DAG to be successfully implemented such that what is printed from the print (X) function is reliable and repeatable, linear ordering is once again used between cells calling a same variable. Thus, in this example, notebook tool 130 would draw a directed edge from X=1 to print (X), and would also draw a directed edge from X=2 to print (X). However, because of linear ordering, the first and second cells will always be run in the same order, thus always resulting in the print (X) example reliably using the value of 2 for X.

With a DAG structure established for a notebook, when a cell is run, dependency determination module 204 may determine, using directed edges of the graph structure, a set of precedent cells from which the cell depends. That is, as a default, before or in connection with running the cell, dependency determination module 204 may traverse directed edges of the graph structure. The traversal may result in one or more of running each precedent cell that is connected to the cell to be run by a directed edge and/or returning an identification of each precedent cell. Where each precedent cell is run, values for cells (e.g., values of variables within cells, values determined by functions within cells, and so on) may be written to context datastore 250. Further detail about use of context datastore 250 is described in further detail below with respect to context module 206.

In an embodiment, running dependency determination module 204 may occur as a default when a cell is run. Dependency determination module 204 may, optionally, additionally run stale cells relating to the cell when the cell is run. The term "stale", as used herein, refers to a state of a given cell any of the following is true: (1) the cell has not yet been run in a current kernel session; (2) an upstream cell has been edited but the given cell not been re-run; (3) an upstream cell has been run more recently than the given cell itself; and (4) an upstream cell has become stale. For example, returning to the example of cell 1, which defines x=1 and y=2, cell 2 having a value of x, and cell 3 having a value of y, if cell 1 was run more recently than cells 2 or 3, cells 2 and 3 are stale. Stale upstream ancestor cells (that is, cells that are pointed to by a directed edge from a more recently run cell) may be re-run along with precedent cells from which a code cell depends.

The graph data store 260 stores the directed acyclic graph constructed based on dependencies of the cells received via a notebook. The graph data store 260 stores the directed acyclic graph as nodes and edges, where a node represents a cell and an edge indicates a dependency between two nodes. For example, an edge from a cell C1 to a cell C2 indicates a dependency between cell C1 and C2 such that cell C1 must be executed before cell C2. If there are two cells C1 and C3, both having an edge to cell C2 but without any edges between C1 and C3, the system may execute cells C1 and C3 in parallel. Each node corresponds to a cell and the term node may be used interchangeably with the term cell.

Although the edges of the directed acyclic graph point in a particular direction based on the dependencies between cells, the system may store relations obtained by traversing the direction opposite of each edge. For example, if an edge points from cell C1 to cell C2, the system may store information indicating that cell C2 receives an edge from cell C1. The relationships that are opposite of the directions of the edge may be used to identify cells on which a particular cell depends so as to efficiently identify precedent cells related to the particular cell for execution if a request is received to execute the particular cell.

Figure 5:
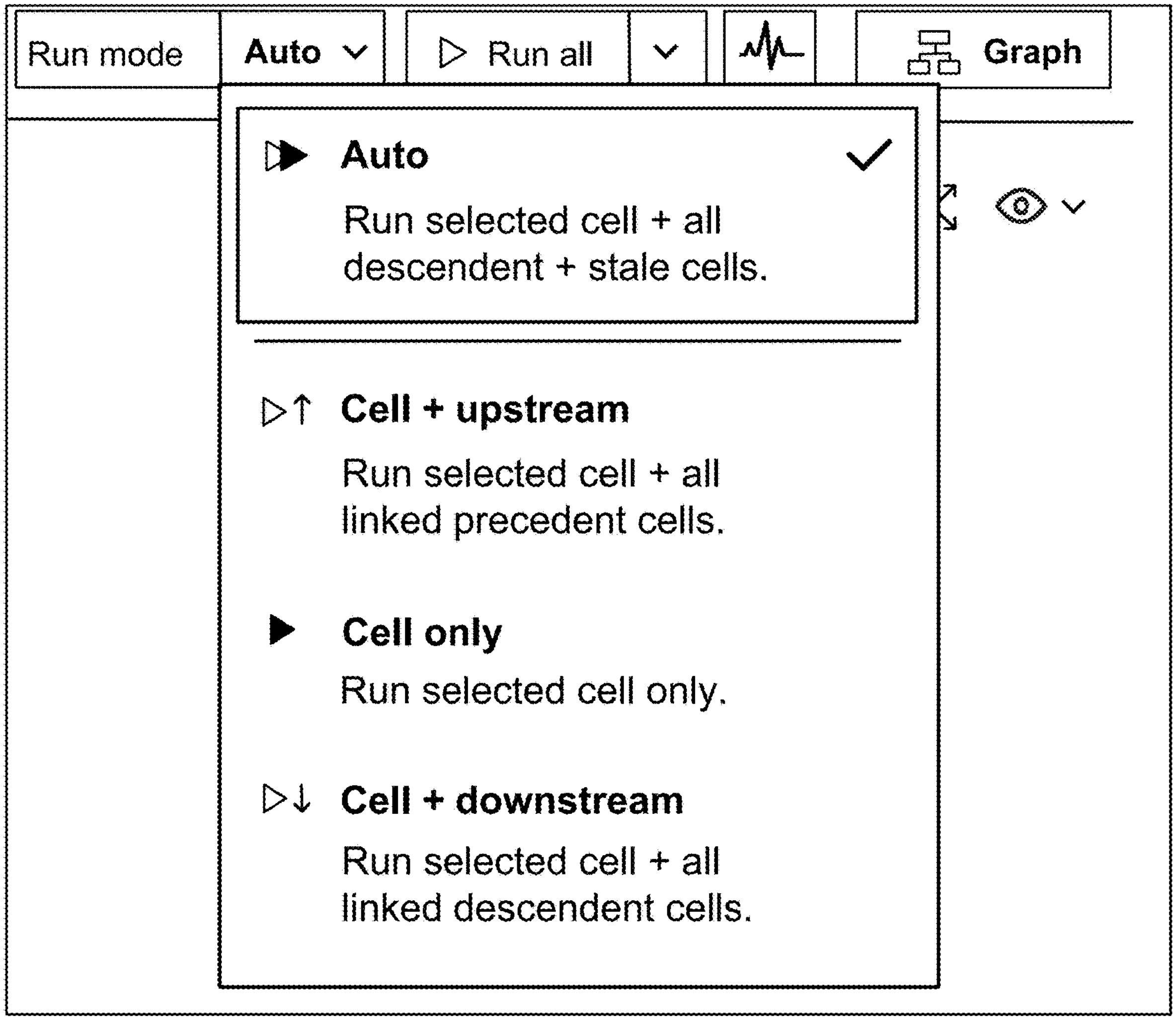
FIG. 5 illustrates an exemplary user interface for customizing which cells are run, according to an embodiment.

Turning for the moment to FIG. 5, FIG. 5 illustrates an exemplary user interface for customizing which cells are run in connection with a request. User interface 500 shown in FIG. 5, however, may be used in connection with cells that are not involved with a generative AI request. As depicted in user interface 500, a default may be set as described, where when a selected cell is run, its descendent cells and respective stale cells are run. Other options, however, are available. Application 111 may enable a user to select running a selected cell and its linked precedent cells, just the cell itself, or the cell and its linked descendent cells, at the user's option. A selected option may be incorporated by application 111 as a new default operation for a given cell or for all cells until a new default is selected by a user.

After a code cell (or any other type of cell) is generated (and other cells are run), a user may wish to save the notebook, or a notebook may be saved automatically. Responsive to detecting a save operation, notebook tool 130 may generate a save file for the cells by aggregating project-level metadata and metadata for each cell of the plurality of cells, while omitting outputs from each cell of the plurality of cells. That is, the output of the cells is not part of the save files, and only the code for each code cell is saved. Optionally, data connection credentials, secrets, and other sensitive items are also omitted. By selectively omitting these features, the save file allows for a project to be synchronized in other spaces (e.g., github) while avoiding integration issues that might otherwise prevent publication (e.g., version comparison issues) and reducing overall storage space that would otherwise be dedicated to storing the output.

Exemplary Processes

Figure 6:
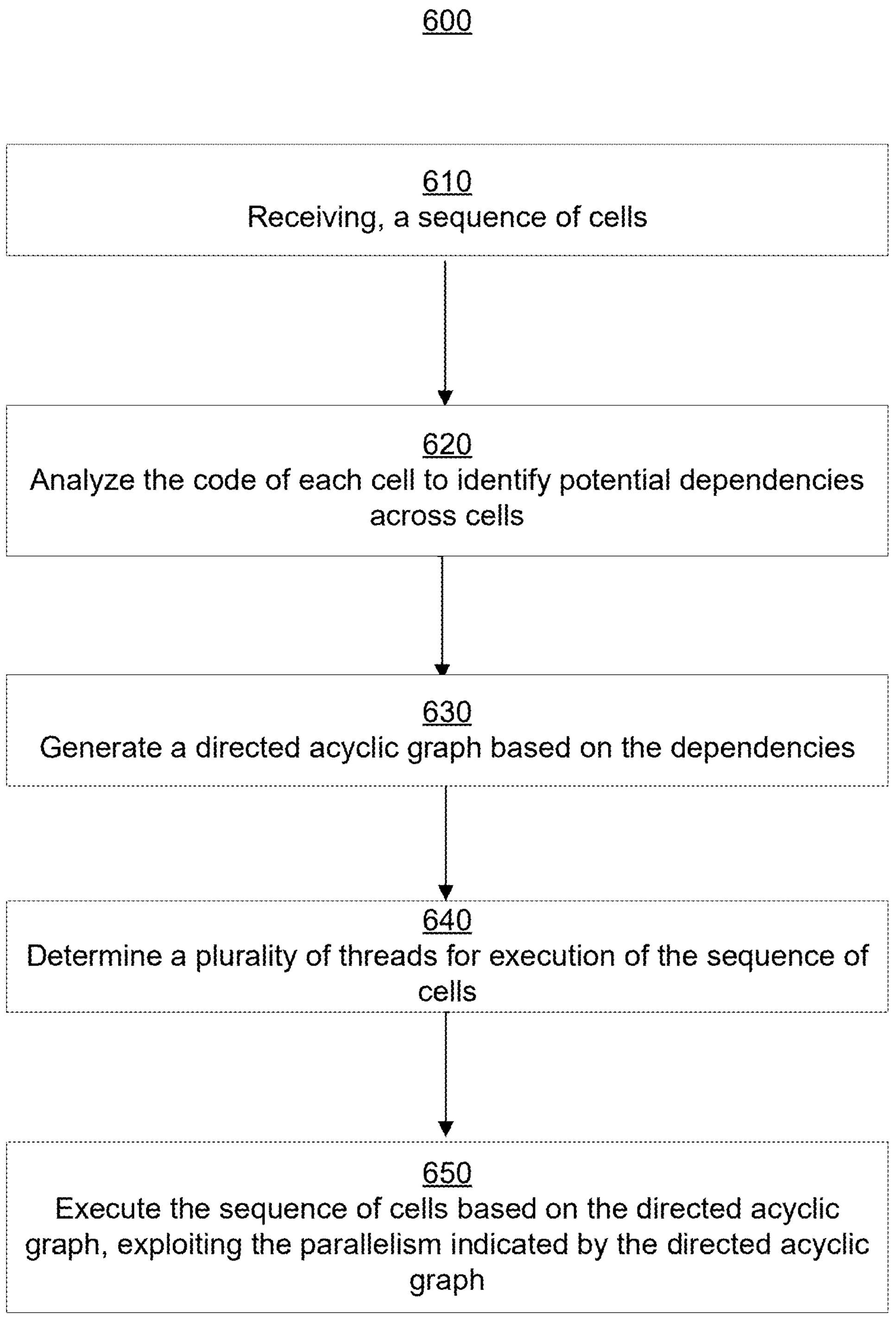
FIG. 6 is an exemplary flowchart illustrating a process for parallel execution of cells of a notebook, in accordance with an embodiment.

FIG. 6 is an exemplary flowchart illustrating a process for parallel execution of cells of a notebook, in accordance with an embodiment. Process 600 is described herein as being executed by a system which may be the notebook application 111 and/or notebook tool 130 having one or more modules execute computer-readable instructions, though for convenience and brevity it is recited from the perspective of notebook tool 130 only.

The system receives 610 a sequence of cells that are part of a notebook. At least some of the cells include executable code. The code of a cell may be specified using programming languages, for example, Python. The code of a cell may include database commands specified using database query language such as SQL (structured query language). A cell may have an input, an output, or both. The output of a cell may be provided as input to another cell, thereby creating a dependency between the cells.

The system analyzes 620 the code of each cell, for example, by parsing the code to identify any inputs and outputs of the code. The system generates 630 based on the analysis of the cells, a directed acyclic graph. The directed acyclic graph includes nodes and edges, wherein nodes correspond to cells and edges represent dependencies between cells. For example, there is an edge from a cell C1 to a cell C2 if the cell C2 depends on execution of the cell C1. Cell C2 may depend on execution of cell C1 if an output generated by cell C1 is received as input by the cell C2.

The system determines 640 a plurality of threads for execution of the sequence of cells of the notebook. The threads may be created for execution of the notebook or the system may maintain a pool of threads and select a set of threads that are currently available for processing the notebook. The threads may execute cells in parallel if the directed acyclic graph indicates they can be executed in parallel. The system may also reorder execution of the cells if the directed acyclic graph indicates there is no required order of the cells and they can be executed in parallel.

Execution of different cells by separate threads ensures that if a particular cell is taking long to execute, the other cells are not blocked. For example, a cell may be waiting or input/output or for an eternal system if the cell invokes an API of an external system. However, other cells can continue execution in parallel if allowed by the directed acyclic graph.

According to an embodiment, the system allows the user to configure the amount of parallelism that can be exploited, for example, by specifying the number of threads or tasks that can be run in parallel. That way if the program has an excessive amount of parallelism, for example, hundreds of queries that can be run in parallel, the system will ensure that only a limited number of queries are executed in parallel at a time. This ensures that the resources of the system are utilized in a controlled manner and the system is not overwhelmed by utilization of resources due to excessive parallelization.

The system performs the step 650 of executing the sequence of cells in the order determined by the directed acyclic graph. Some of the cells may be executed in parallel if there are no dependencies between the cells. A plurality of cells may be executed in parallel if each cell of the plurality of cells is unreachable from the remaining of the plurality of cells by following edges of the directed acyclic graph. Accordingly, the plurality of cells is executed in parallel if there are no dependencies between the cells of the plurality of cells.

According to an embodiment, the system parses the code of each cell to identify variables processed in each cell. The system determines the dependencies between cells based on the variables. For example, if a cell C1 includes code that assigns value to a variable X and cell C2 includes code that reads the value of X, a dependency edge is created between cells C1 and C2 indicating that cell C1 must be executed before cell C2.

Figure 7:
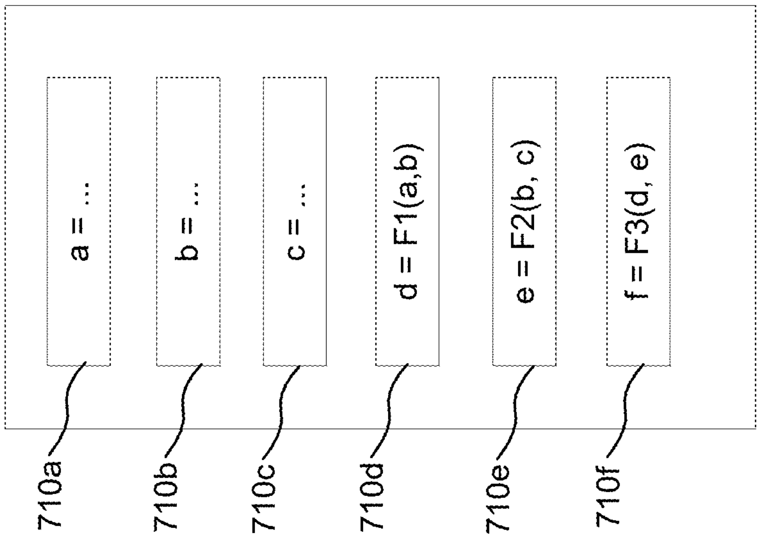
FIG. 7 shows an example notebook comprising a sequence of cells based on Python code, according to an embodiment.

FIG. 7 shows an example notebook comprising a sequence of cells based on Python code, according to an embodiment. The example notebook includes a sequence of cells 710*a*, 710*b*, 710*c*, 710*d*, 710*e*, 710*f*. Other examples may include more or fewer cells. The example cells shown in FIG. 7 specify code in a programming language such as Python. Although Python is used for the examples disclosed herein, the cells may be based on other programming languages such as Java. Cell 710*a* includes code that determines a value of variable a based on certain computation. Similarly, cell 710*b* includes code that determines a value of variable b based on certain computation and cell 710*c* includes code that determines a value of variable c based on certain computation. The computation of variables a, b, and c may be based on values that were determined by previous cells or may be determined based on interactions with file systems, external systems such as web services and so on. The cell 710*d* includes code that determines value of variable d as a function F1 of variables a and b. The cell 710*e* includes code that determines value of variable e as a function F2 of variables b and c. The cell 710*f* includes code that determines value of variable e as a function F3 of variables d and e.

Figure 8:
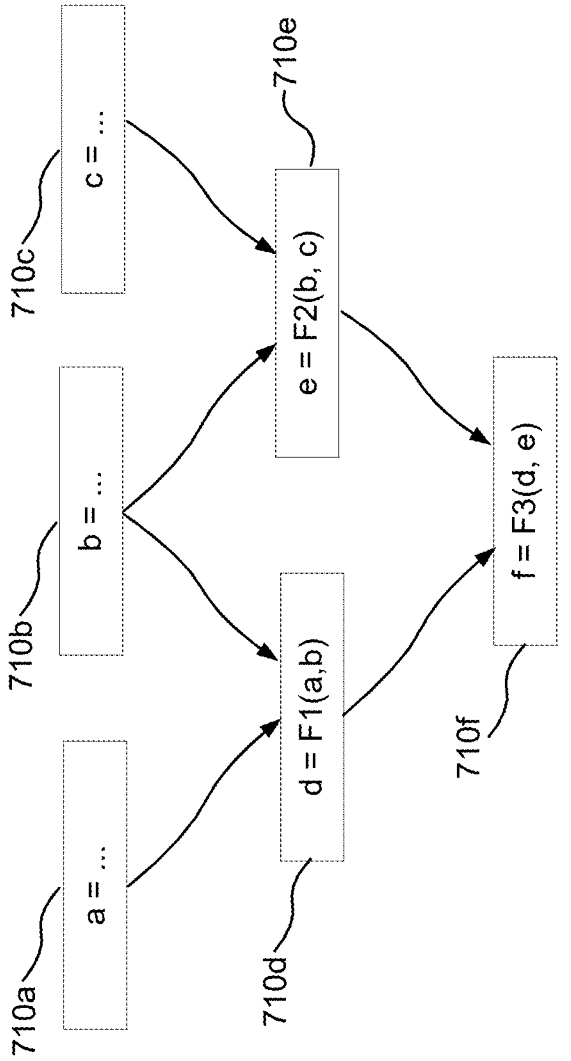
FIG. 8 shows a directed acyclic graph generated from the example notebook shown in FIG. 7, according to an embodiment.

FIG. 8 shows a directed acyclic graph generated from the example notebook shown in FIG. 7, according to an embodiment. Assuming the code of cells 710*a*, 710*b*, and 710*c* does not depend on each other, these cells do not have any dependencies or edges of the directed acyclic graph between them and can be executed in parallel with respect to each other. Cell 710*d* includes code that determines the value of variable d as a function F1 of variables a and b and therefore depends on cells 710*a* and 710*b*. Accordingly, the system creates an edge from cell 710*a* to 710*d* and an edge from cell 710*b* to cell 710*d*. Similarly based on the dependencies, the system creates an edge from cell 710*b* to 710*e* and an edge from cell 710*c* to cell 710*e*. Since the cell 710*f* includes code that determines the value of variable e as a function F3 of variables d and e the system creates an edge from cell 710*d* to 710*f* and an edge from cell 710*e* to cell 710*f*. Accordingly, the system generates the directed acyclic graph, for example, as shown in FIG. 8 based on a notebook comprising a sequence of cells, for example, as shown in FIG. 7.

According to an embodiment, the user may select a particular cell and request execution of that particular cell. For example, the user interface allows the user to select a specific cell and indicate that the cell should be executed. The system traverses the directed acyclic graph corresponding to that notebook to identify a subset of cells that need to be executed to be able to execute that particular cell. For example, if the user requests execution of cell 710*d*, the system traverses the directed acyclic graph to identify a subset of cells on which the cell 710*d* depends, for example, the cells 710*a* and 710*b*. The system executes the subset of cells comprising a subgraph of the directed acyclic graph. The system executes the cell identified for execution, for example, cell 710*d* based on the values determined from execution of the subset of cells.

Figure 9B:
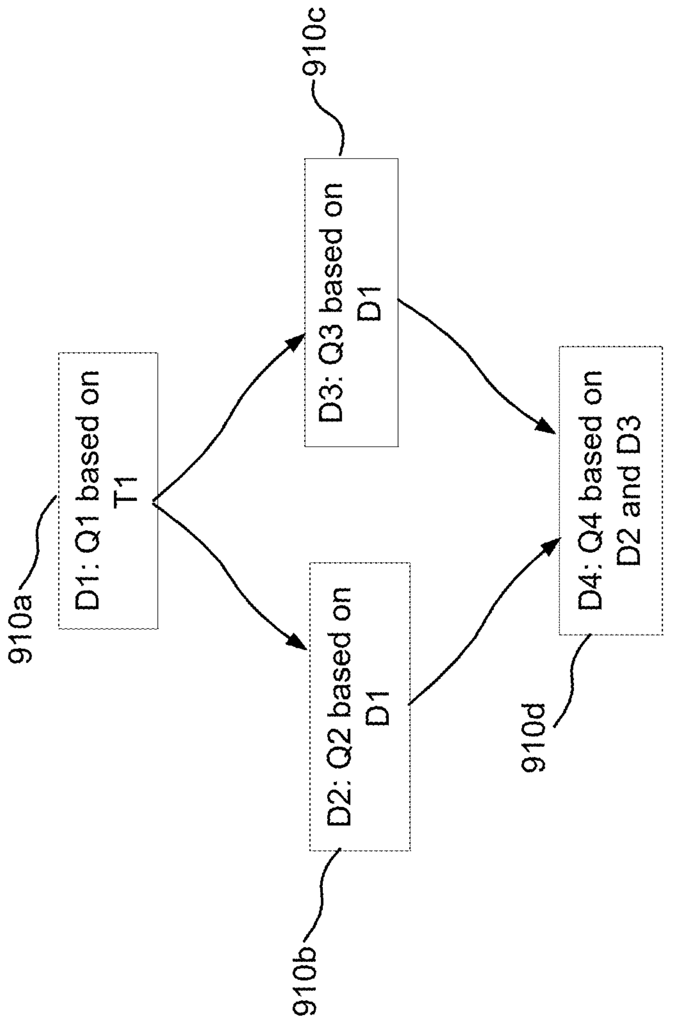
FIG. 9B shows a directed acyclic graph generated from the example notebook shown in FIG. 9A, according to an embodiment.
Figure 9A:
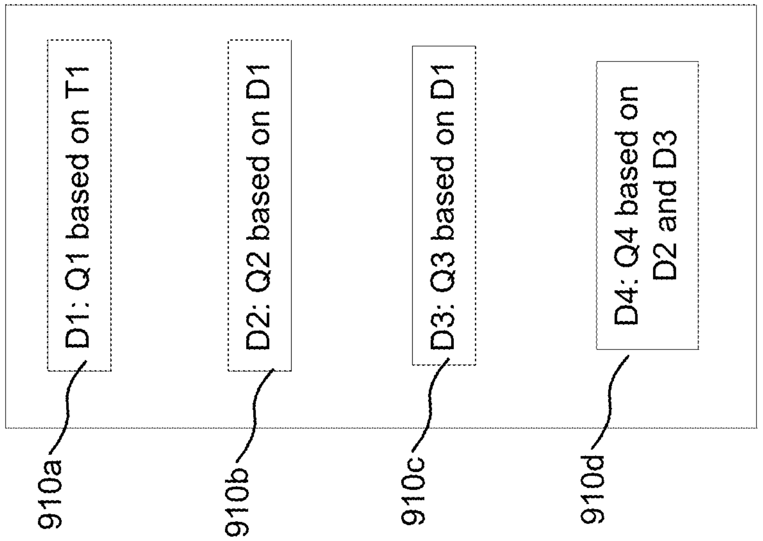
FIG. 9A shows an example notebook comprising a sequence of cells based on database statements, according to an embodiment.

FIG. 9A shows an example notebook comprising a sequence of cells based on database statements, according to an embodiment. The example notebook includes a sequence of cells 910*a*, 910*b*, 910*c*, 910*d*. Other examples may include more or fewer cells. The example cells shown in FIG. 9A specify code in a database query language such as SQL. Cell 910*a* includes code that executes a database query Q1 that processes data from a table T1.

The result computed by the database query Q1 is stored in a dataframe D1. A dataframe is a data structure configured to store values of various data types. A dataframe may organize the values as rows and columns and can be used to store results of a database query. The cell 910*b* includes code that comprises a database query Q2 that processes the data of dataframe D1 and stores the result in dataframe D2. The cell 910*c* includes code that comprises a database query Q3 that processes the data of dataframe D1 and stores the result in dataframe D3. The cell 910*d* includes code that comprises a database query Q4 that processes the data of dataframe D2 and D3, for example, by performing a join of the two dataframes based on certain columns of the dataframes D2 and D2 and stores the result in dataframe D4.

FIG. 9B shows a directed acyclic graph generated from the example notebook shown in FIG. 9A, according to an embodiment. Cell 910*b* includes code that depends on the cell 910*a* that generates dataframe D1 as the result of query Q1. Similarly, cell 910*c* includes code that depends on the cell 910*a* that generates dataframe D1 as the result of query Q1. Accordingly, the system creates an edge from cell 910*a* to 910*b* and an edge from cell 910*b* to cell 910*b*. Cell 910*d* includes code that depends on the cells 910*b* and 910*c* that generate dataframes D2 and D3 as results of queries Q2 and Q3 respectively. The system creates an edge from cell 910*b* to 910*d* and an edge from cell 910*c* to cell 910*d*. Accordingly, the system generates the directed acyclic graph, for example, as shown in FIG. 9B based on the notebook comprising the sequence of cells shown in FIG. 9A.

According to an embodiment, the system identifies at least a subsequence of cells belonging to the sequence of cells of a notebook that includes a particular cell that is determined to be unsafe for parallelization. If there are cells in the subsequence that occur before the particular cell, the system introduces an edge from each cell of the subsequence that occurs before the particular cell to the particular cell. If there are cells in the subsequence that occur after the particular cell, the system introduces an edge from the particular cell to each cell of the subsequence that occurs after the particular cell.

Figure 10B:
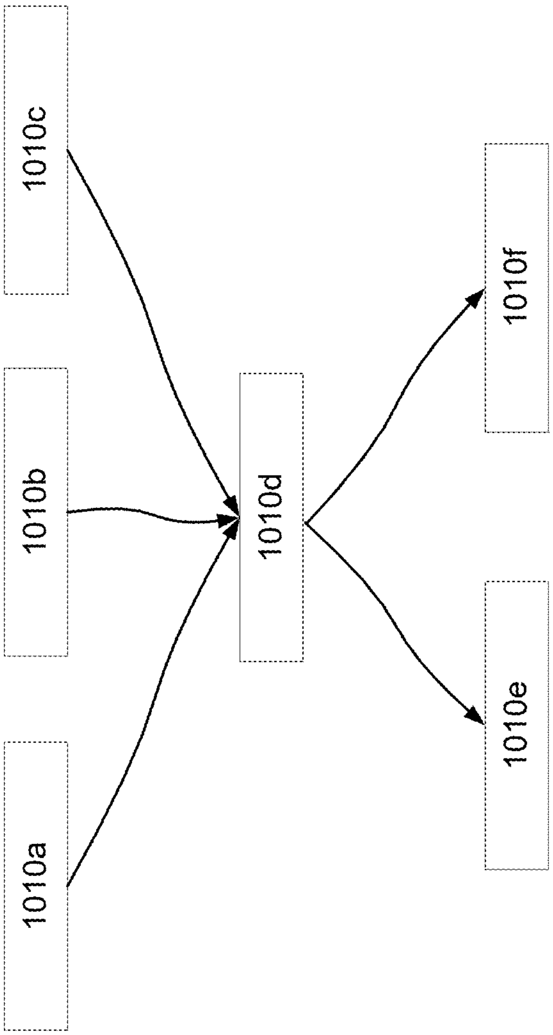
FIG. 10B shows a directed acyclic graph generated from the example notebook shown in FIG. 10A, according to an embodiment.
Figure 10A:
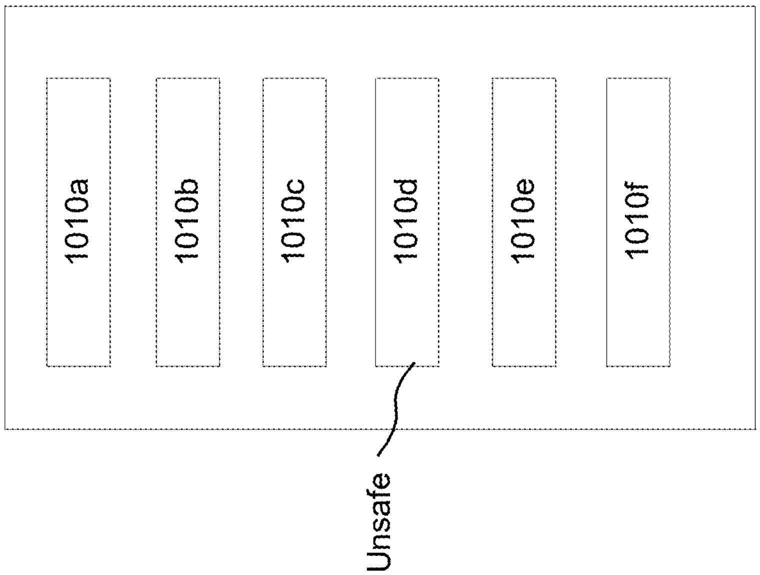
FIG. 10A illustrates a notebook with a sequence of cells including a cell determined unsafe for parallelization, according to an embodiment.

FIG. 10A illustrates a notebook with a sequence of cells including a cell determined unsafe for parallelization, according to an embodiment. The example notebook includes a sequence of cells 1010*a*, 1010*b*, 1010*c*, 1010*d*, 1010*e*, 1010*f*. Other examples may include more or fewer cells. The sequence of cells includes a cell 1010*d* that is determined unsafe for parallelism. The system may determine code of a cell as unsafe for execution if the code of the particular cell performs a mutation operation, for example, an operation that modifies a value of the array.

According to an embodiment, if the code of the cell includes database operations, the cell is determined to be unsafe for parallelization if the database operations performed by the code of the cell include one or more of insert, update, delete, set operations, or an operation that modifies the structure of the schema, for example, an alter table operation. According to an embodiment, the system determines the specific tables that are being modified to analyze dependencies between statements. For example, if a table T1 is being updated by code of a target cell C1, the system ensures that cells including SELECT statements that process table T1 have dependencies with the target cell C1, however unnecessary dependencies are not created between target cell C1 and cells that include queries based on cells with SELECT queries that process other tables such as tables T2, T3.

According to an embodiment, the system stores a list of functions determined to be unsafe for parallelization. Accordingly, the system determines that the particular cell from the subsequence is unsafe for parallelization if the code of the particular cell invokes a function from the list of functions pre-determined to be unsafe for parallelization. According to an embodiment, the system stores a whitelist of functions determined to be safe for parallelization. Accordingly, the system determines that the particular cell from the subsequence is safe for parallelization if the code of the particular cell invokes a function from the whitelist of functions pre-determined to be safe for parallelization.

According to an embodiment, the code of the cell includes Python code and the system determines that the cell is unsafe for parallelization if the code of the cell invokes a function that uses a global dictionary of variables, for example, the globals( ) function of Python. In general, if all the cells of a sequence of cells perform functional computations that do not modify a global state of the program being executed, the system determines that the cells of the sequence of cells can are safe for parallelization and can be executed in parallel. For example, SELECT queries of the SQL language are functional and cells that include only SELECT queries without including are safe to parallelize. Similarly, if the code of a cell is just displaying values of a variable or using them in other functional statements, the cell is determined to be safe for parallelizing.

FIG. 10B shows a directed acyclic graph generated from the example notebook shown in FIG. 10A, according to an embodiment. As shown in FIG. 10A, cells 1010*a*, 1010*b*, and 1010*c* occur before the cell 1010*d* in the sequence shown and cells 1010*e* and 1010*f* occur after the cell 1010*d* in the sequence. The system generates the directed cyclic graph that includes the edge as shown in FIG. 10B. Particularly, the system includes edges from the cells 1010*a*, 1010*b*, and 1010*c* that occur before the cell 1010*d* to the cell 1010*d*. Furthermore, the system includes edges from the cell 1010*d* to the cells 1010*e* and 1010*f* that occur after the cell 1010*d* in the sequence.

Transforming Code for Optimized Execution of Cells

According to an embodiment, the system combines code of a plurality of cells into a single cell to be able to optimize the code better. The code may include statements in a database query language or may include instructions in a programming language such as Python. In general, if the result of computation of a source cell C1 is used in the code of a target cell C2, the system may transform the code of cell C2 by composing the code of cell C1 with the code of cell C2. Similarly, if the results of computation of multiple cells C11 and C12 are used in the code of a target cell C2, the system may transform the code of cell C2 by composing the code of each of the cells C11 and C12 with the code of target cell C2. The transformed code of the target cell C2 is effectively performing the same computation as the code prior to the transformation. However, transformed code includes the code of the source cells within the target cell instead of the result determined by the source cell. This allows the system to optimize the code of the target cell better. For example, each source cell may include a query and the target cell includes a query that joins dataframes generated by each of the source cell. The system transforms the query of the target cell to generate a query that includes the queries of the source cells as subqueries. This allows the system to optimize the query of the target cell better, for example, by further rewriting the query, by using appropriate indexes or performing any necessary optimizations that may not be possible if the query of the target cell specified only the dataframes and did not specify the corresponding queries used to generate the dataframes.

Figure 11:
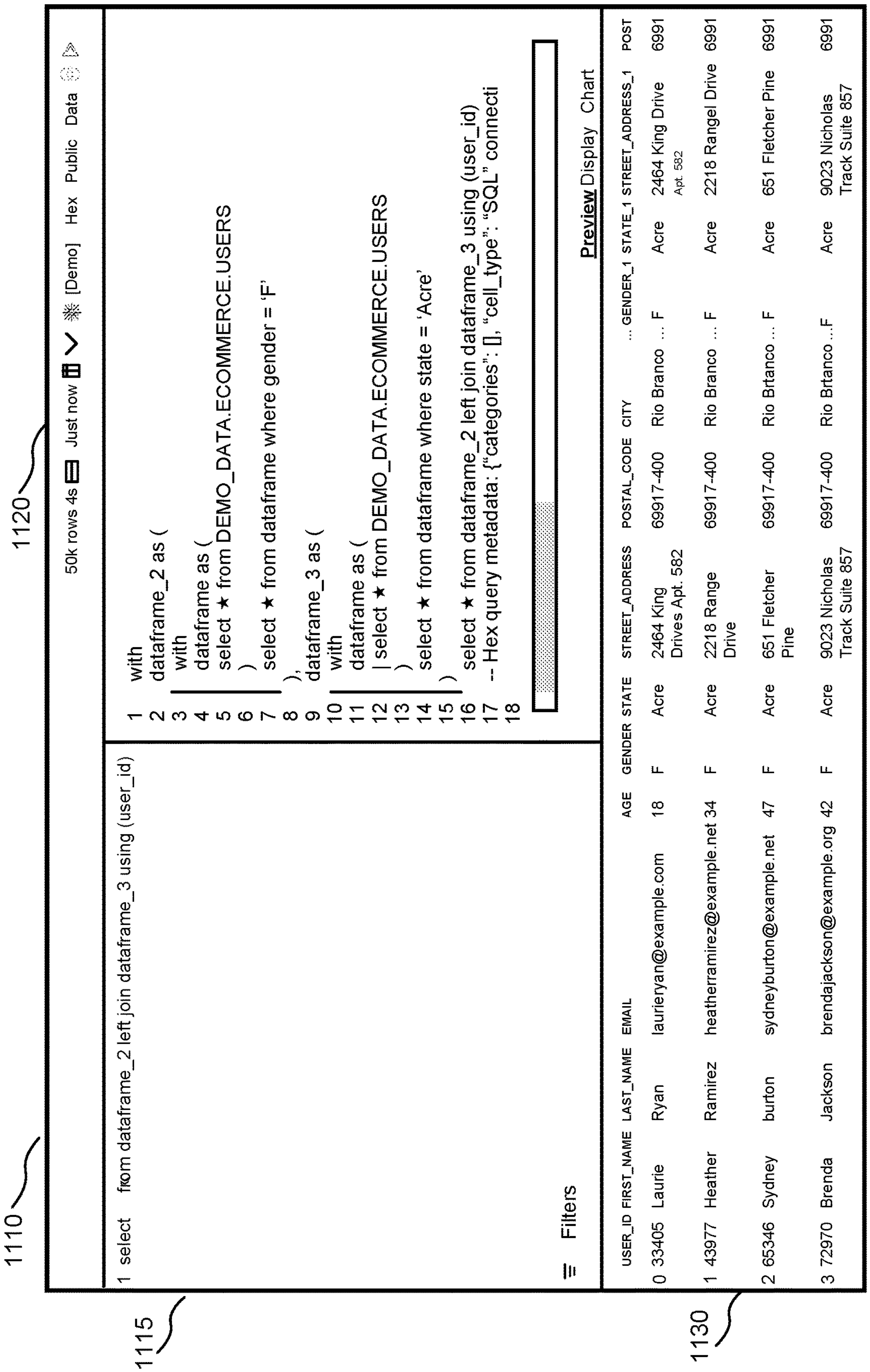
FIG. 11 shows a screenshot of a user interface showing a cell including code that is obtained by composing other cells, according to an embodiment.

FIG. 11 shows a screenshot of a user interface showing a cell including code that is obtained by composing other cells, according to an embodiment. The user interfaces displays a target cell 1010. The user inputs the query 1015 for the target cell that joins dataframes computed by two previous cells. For example, the target cell may correspond to the cell 910*d* shown in FIG. 9B that joins the dataframes created by the two source cells 910*b* and 910*c*. The target cell 1010 is configured to allow the user to preview the result of the query as result 1130. The user interface further displays the transformed query 1120 obtained by composing the queries of the source cells with the query 1115 of the target cell to generate an equivalent query that computes the same result as the query 1115 provided by the user. The query 1120 can be optimized better than the query 1115 and is computationally more efficient, for example, in terms of execution time or storage including in-memory storage or permanent storage, for example secondary storage.

Preview Mode Execution of Cell

According to an embodiment, a user may request a cell to execute in a preview mode. The code of a cell executed in preview mode displays a subset of results that may be generated by the code. For example, if the cell includes a database query that could potentially return thousands of rows, the cell displays only a subset of rows, for example, 100 rows. This ensures that the code of the cell in preview mode executes in less time than the code may take for full execution to compute the full set of results.

According to an embodiment, the system transforms the code of the cell to compute a subset of the results for preview and executes the transformed code for displaying the results in preview mode. For example, the system may modify a database query to compute only a subset of results, for example, 100 results. The transformed query that presents a subset of results executes faster than the query that determines a full set of results if the result set is large that is typically expected from most database queries.

If the system composes a source query of a source cell with a target query of a target cell, the system may execute the query in two different modes. For example, if the source cell is executed in preview mode, the system executes a transformed version of the query that computes a subset of results meant for displaying in preview mode. However, the source query may be further executed as a subquery of the target query by composing the target query with the source query. The source query that is executed as a subquery of the target query computes the full set of results. The results of the source query may be joined with results of other source queries that are composed with the target query. Accordingly, even though the full results of each source query are computed for executing the target cell, the final result set of the target cell may or may not be small, depending on the join criteria of the target query.

Interactive Modification of Cells

According to an embodiment, the system allows users to interactively modify the code of individual cells. The system analyzes the modified code of a cell to incrementally evaluate the modifications to the directed acyclic graph and updates the directed acyclic graph to reflect the modified code of the cell. Subsequent executions of the notebook or execution of specific cells as selected by the user determine the subset of cells necessary for execution based on the modified directed acyclic graph and execute the subset of cells in an order determined by the modified directed acyclic graph.

According to an embodiment, the system determines any changes to the inputs and outputs of the target cell based on the modification of the target cell. The system may add or remove edges of the directed acyclic graph based on the changes to the inputs and outputs of the target cell. For example, if a new input is added to the code of the target cell, the system may add an edge from a source cell that determines the value of that input. If an input is removed from the code of the target cell, the system may remove an edge from a source cell that determines the value of that input. If the target cell determines a set of outputs and a new output is added to the set, the system may add new edges from the target cell to other cells that use the new output. If the target cell determines a set of outputs and the code of the target cell is modified to remove an output from the set, the system may delete existing edges from the target cell to other cells that use the output that is deleted, assuming the code of those cells is appropriately modified.

For example, assume that the query of a target cell C2 processes a dataframe D1 generated by a source cell C11. The directed acyclic graph includes an edge from a source cell that determines the dataframe D1 to the target cell. If the query of the target cell C2 is modified to join the dataframe D1 with another dataframe D2 generated by a source cell C12, the system modifies the directed acyclic graph to add an edge from the source cell C12 to the target cell C1.

Similarly, assume that the query of the target cell C2 joins dataframes including a dataframe D1 generated by a source cell C11 and a dataframe D2 generated by a source cell C12. If the query of the target cell C2 is modified to remove the dataframe D1 from the join clause, the system modifies the directed acyclic graph to remove the edge from the source cell C11 to the target cell C2.

The dynamic modification of the directed acyclic graph ensures efficient execution of the cells of the notebook and also ensures correctness of the result of execution of the notebook. The addition or removal of edges may affect the amount of parallelism available in the directed acyclic graph for executing the cells of the notebook.

Pruning of Cells for Optimized Execution

According to one or more embodiments, the system optimizes execution of cells of a notebook by pruning one or more cells, i.e., excluding one or more cells during execution of the notebook.

Figure 12:
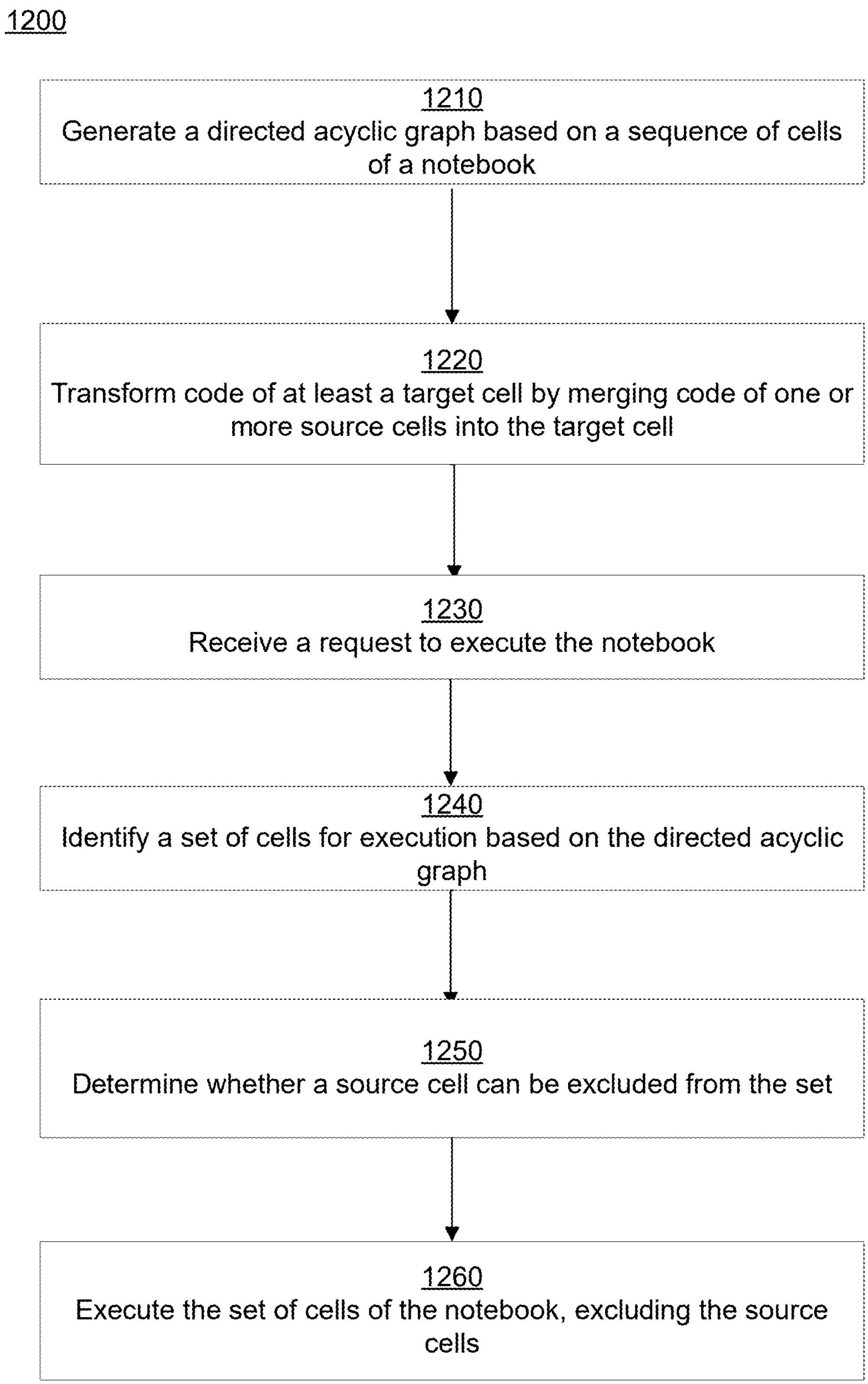
FIG. 12 is an exemplary flowchart illustrating a process for pruning of cells of a notebook, in accordance with an embodiment.

FIG. 12 is an exemplary flowchart illustrating a process for pruning of cells of a notebook, in accordance with an embodiment. Process 900 may be run by notebook application 111 and/or notebook tool 130 having one or more modules execute computer-readable instructions, though for convenience and brevity it is recited from the perspective of notebook tool 130 only.

The system receives via a user interface, for example, the notebook interface, a sequence of cells of a notebook. The system generates 1210 a directed acyclic graph comprising cells of the sequence of cells connected by edges.

The system transforms 1220 the code of a target cell to include code of one or more source cells. For example, the transformed code of the target cell is obtained by composing code of the one or more cells as illustrated in FIG. 11. In various embodiments, the system may identify any sequence of cells of the graph and merge them, for example, to optimize the execution of the sequence of cells. The transformed code of the target cell to include code of the one or more source cells, such that the transformed code generates output matching output of the target cell prior to transformation. The transformed code may be optimized such that execution of the target cell after transformation of the code is more efficient compared to execution of the target cell prior to transformation.

The system receives 1230 a request to execute at least a portion of the notebook comprising a cell from the sequence of cells. The request may be a request to execute the entire notebook, i.e., the full sequence of cells of the notebook or a request to execute a target cell identified by the user via the interface.

The system identifies 1240 a set of cells of the sequence of cells for execution based on the directed acyclic graph. The subset of cells includes precedent cells from which the target cell depends, i.e., cells from which a target cell identified for execution can be reached by following the edges of the directed acyclic graph. The set of cells may be the entire sequence of cells if the user requests execution of the full notebook.

The system determines 1250 whether a source cell can be excluded from execution of the notebook based on properties of the source cell. For example, the system determines that a source cell cannot be excluded from the execution if the source cell generates a dataframe that represents data stored in memory and the dataframe is processed by another target cell that depends on the source cell, for example, a target cell with code in a programming language such as Python that refers to the dataframe. In this example, the source dataframe includes a database query, and the dataframe stores the result of execution of the database query of the source cell in memory. The target cell with code in a programming language such as Python processes the in-memory data structure represented by the dataframe. As a result, the source cell cannot be excluded during execution and is executed to build the in-memory data structure represented by the dataframe so that target cell with code in a programming language such as Python can access the in-memory data structure.

As another example, the system determines that a source cell cannot be excluded from the execution if the source cell includes code that performs mutation, for example, by executing an insert, update or delete statement of a database query language. The system determines if the source cell cannot be excluded for any of these reasons. If none of the reasons are relevant to the cell the system excludes the source cell from the set of cells executed. Accordingly, if the system determines that the source cell can be excluded, the system executes 1260 the set of cells without the source cell.

According to an embodiment, the system executes a particular cell by traversing the directed acyclic graph to identify a subset of cells on which the execution of the particular cell depends. The system executes the subset of cells based on an order specified by the directed acyclic graph. The system executes the particular cell based on values determined based on execution of the subset of cells.

According to an embodiment, the system executes the subset of cells in an order determined by the directed acyclic graph such that a plurality of cells is executed in parallel. The cells. The plurality of cells that can be executed in parallel are cells that do not have dependencies with each other, i.e., each cell of the plurality of cells is unreachable from remaining of the plurality of cells by following edges of the directed acyclic graph.

The pruning of cells by excluding cells during execution improves the efficiency of execution of the cells since fewer cells are executed and the target cell that is transformed by including code from source cells can be optimized for execution better compared to the cells before transformation.

Multi-Dag Based Execution of Notebook

According to one or more embodiments, the system transforms the directed acyclic graph by replacing individual nodes with a subgraph.

Figure 13:
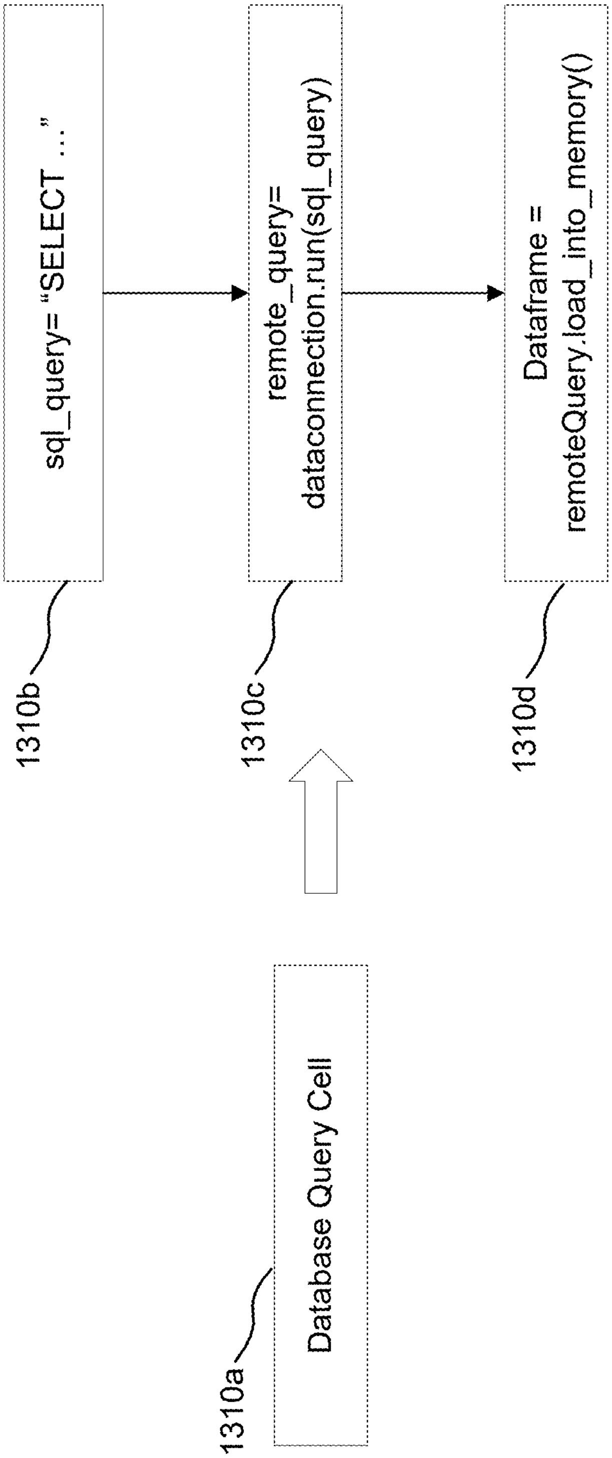
FIG. 13 illustrates transformation of a cell into a subgraph, according to an embodiment.

FIG. 13 illustrates transformation of a cell into a subgraph, according to an embodiment. FIG. 13 illustrates transformation of a database query cell. Other embodiments may transform cells of other types. The database query cell 1310*a* is transformed into a subgraph comprising multiple cells including (1) a cell 1310*b* that compiles the database query, for example, by dynamically constructing the query string, potentially referencing other cells/data in the notebook using a templating language, for example, Jinja; (2) cell 1310*c* for performing execution of the query, for example, using a database connection to a remote database; and (3) cell 1310*d* for generating a dataframe from the result of execution of the database query. Other types of cells may be transformed into different types of subgraphs. The edges incoming to the cell 1310*a* become incoming edges to the cell 1310*b* and edges outgoing from cell 1310*a* become edges outgoing from cell 1310*d* in the transformed graph. Following is an example illustrating step 1310*b* that compiles a query. The received query may be "select * from table where column={{filter_value}}", where filter_value was a dynamically set variable in the notebook, the system compiles the resulting query string at run time, for example, to obtain "select * from table where column="a"."

Figure 14:
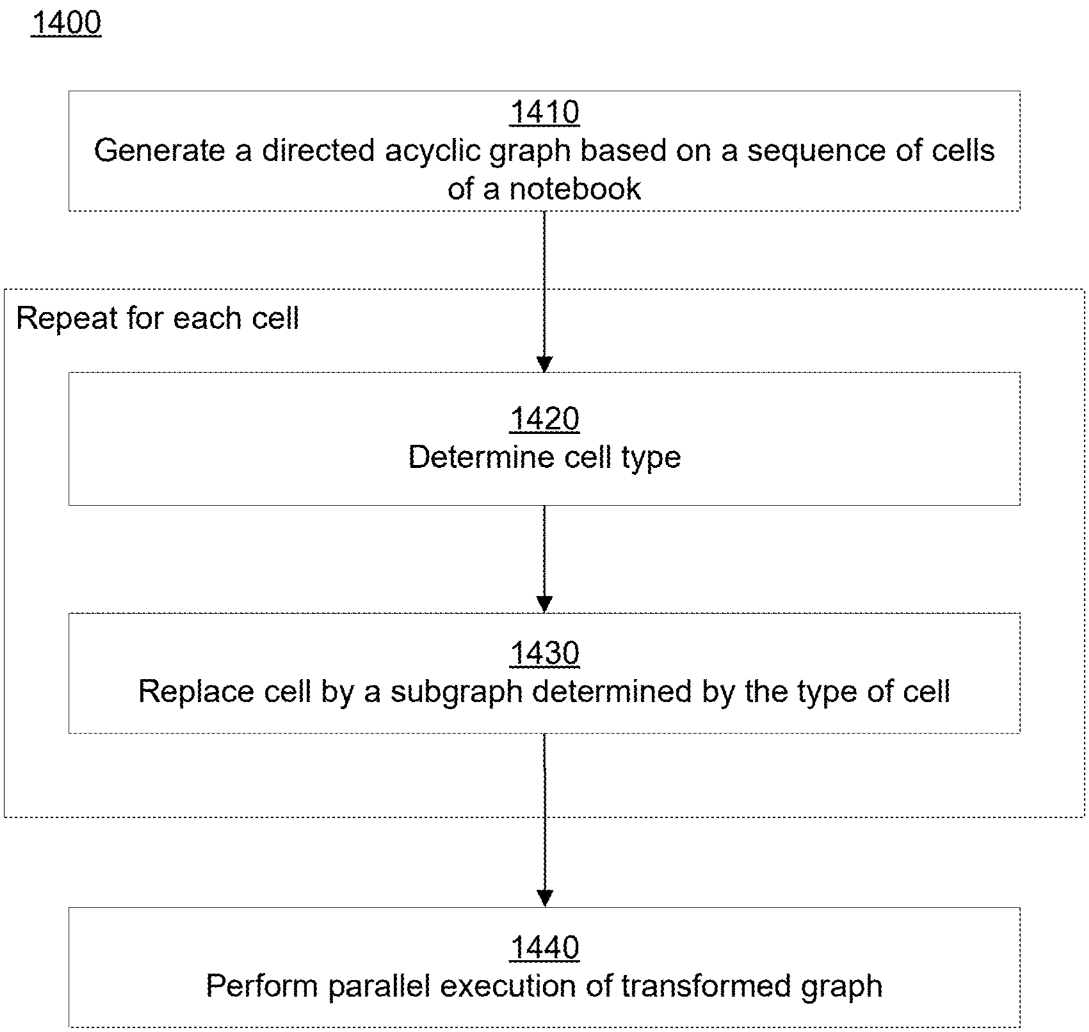
FIG. 14 is an exemplary flowchart illustrating a process for transforming the directed acyclic graph of cells by replacing cells with subgraphs, in accordance with an embodiment.

FIG. 14 is an exemplary flowchart illustrating a process for transforming the directed acyclic graph of cells by replacing cells with subgraphs, in accordance with an embodiment. Process 1400 may be run by notebook application 111 and/or notebook tool 130 having one or more modules execute computer-readable instructions, though for convenience and brevity it is recited from the perspective of notebook tool 130 only.

The system generates 1410 a directed acyclic graph based on a sequence of cells of a notebook. The system transforms the graph by repeating the steps 1420 and 1430 for each cell. Accordingly, for each cell of the directed acyclic graph, the system determines 1420 the cell type. The cell determines the subgraph corresponding to the cell for the cell type and replaces 1430 the cell by the subgraph determined for the cell type. Accordingly, the directed acyclic graph is transformed by replacing various nodes by subgraphs.

The system performs 1440 parallel execution of the transformed graph. Transformation of the graph results in more cells in the directed acyclic graph and as a result has more parallelism that can be exploited by the system during execution of the directed acyclic graph.

Computing Machine Architecture

Figure 15:
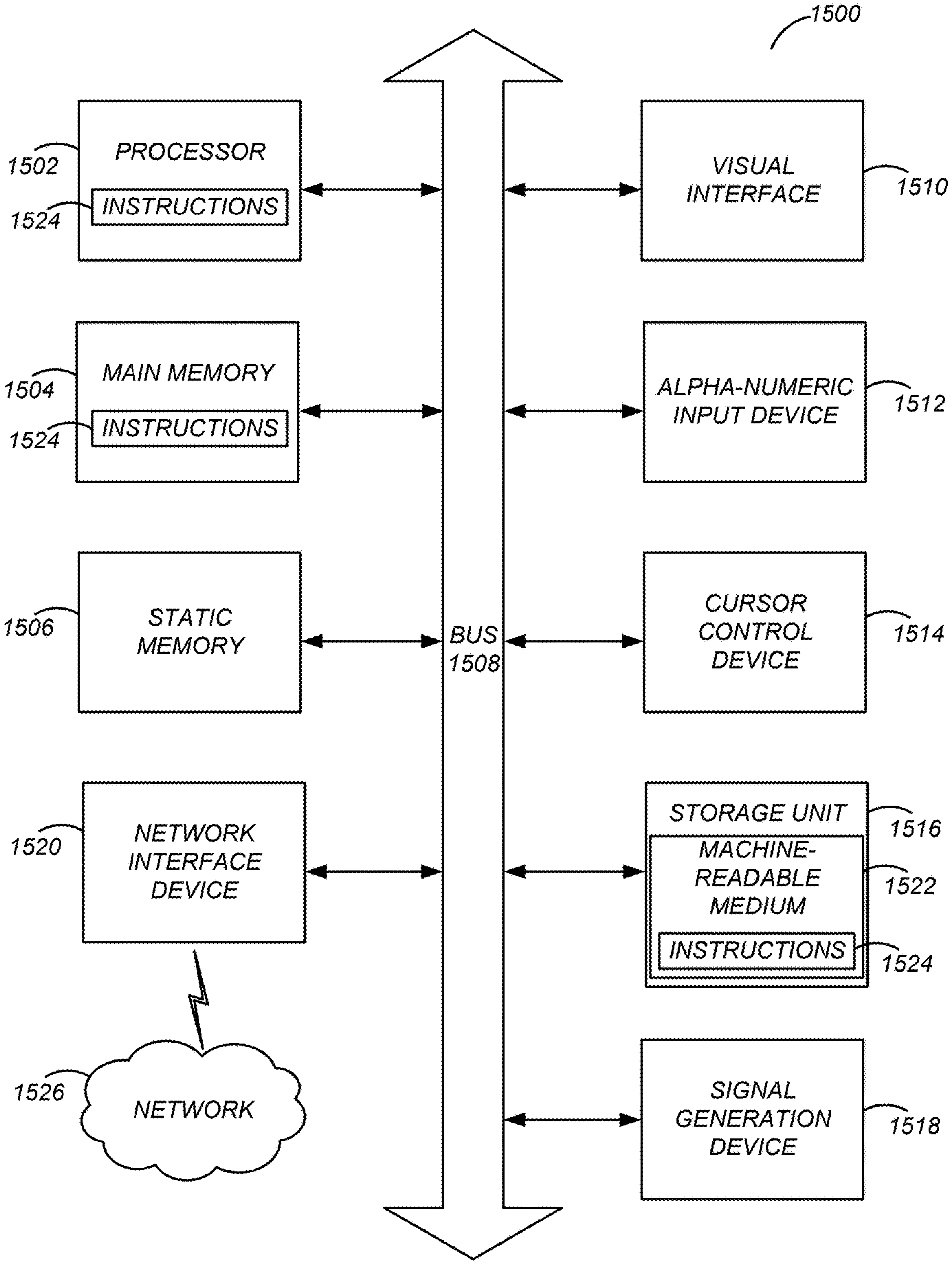
FIG. 15 is a block diagram illustrating components of an example machine able to read instructions from a machine-readable medium and execute them in a processor, according to an embodiment.

FIG. (FIG. 15 is a block diagram illustrating components of an example machine able to read instructions from a machine-readable medium and execute them in a processor (or controller). Specifically, FIG. 15 shows a diagrammatic representation of a machine in the example form of a computer system 1500 within which program code (e.g., software) for causing the machine to perform any one or more of the methodologies discussed herein may be executed. The program code may be comprised of instructions 1524 executable by one or more processors 1502. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1524 (sequential or otherwise) that specify actions to be taken by that machine. Further, while only a single machine is illustrated, the term "machine" shall also be taken to include any collection of machines that individually or jointly execute instructions 1524 to perform any one or more of the methodologies discussed herein.

The example computer system 1500 includes a processor 1502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1504, and a static memory 1506, which are configured to communicate with each other via a bus 1508. The computer system 1500 may further include visual display interface 1510. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 1510 may include or may interface with a touch enabled screen. The computer system 1500 may also include alphanumeric input device 1512 (e.g., a keyboard or touch screen keyboard), a cursor control device 1514 (e.g., a mouse, a trackball, a joystick, a motion sensor, or other pointing instrument), a storage unit 1516, a signal generation device 1518 (e.g., a speaker), and a network interface device 1520, which also are configured to communicate via the bus 1508.

The storage unit 1516 includes a machine-readable medium 1522 on which is stored instructions 1524 (e.g., software) embodying any one or more of the methodologies or functions described herein. The instructions 1524 (e.g., software) may also reside, completely or at least partially, within the main memory 1504 or within the processor 1502 (e.g., within a processor's cache memory) during execution thereof by the computer system 1500, the main memory 1504 and the processor 1502 also constituting machine-readable media. The instructions 1524 (e.g., software) may be transmitted or received over a network 1526 via the network interface device 1520.

While machine-readable medium 1522 is shown in an example embodiment to be a single medium, the term "machine-readable medium" should be taken to include a single medium or multiple media (e.g., a centralized or distributed database, or associated caches and servers) able to store instructions (e.g., instructions 1524). The term "machine-readable medium" shall also be taken to include any medium that is capable of storing instructions (e.g., instructions 1524) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating code for cells having dependencies shown in a DAG using generative AI through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:

receiving via a user interface, a sequence of cells, wherein cells of the sequence of cells comprise executable code, wherein at least some of the cells of the sequence of cells have one or more of an input or an output;

generating based on the cells of the sequence of cells, a directed acyclic graph comprising an edge from a first cell to a second cell if the second cell depends on execution of the first cell, the generating comprising:

identifying a subsequence of cells belonging to the sequence of cells;

determining that a particular cell from the subsequence is unsafe for parallelization; and introducing at least one of (1) an edge from a cell of the subsequence that occurs before the particular cell to the particular cell, or (2) an edge from the particular cell to a cell of the subsequence that occurs after the particular cell; and executing the cells of the sequence of cells in an order determined by the directed acyclic graph, wherein a plurality of cells is executed in parallel responsive to each cell of the plurality of cells being unreachable from remaining of the plurality of cells by following edges of the directed acyclic graph.

2. The method of claim 1, wherein the executable code of cells of the subsequence comprises database query statements, wherein determining that the particular cell from the subsequence is unsafe for parallelization comprises, determining that the executable code of the particular cell comprises one or more of insert, update, or delete operation.

3. The method of claim 1, wherein the executable code of cells of the subsequence comprises database query statements, wherein determining that the particular cell from the subsequence is unsafe for parallelization comprises, determining that the executable code of the particular cell comprises an alter table operation.

4. The method of claim 1, wherein the executable code of cells of the subsequence comprises database query statements, the method further comprising:

storing a list of functions determined to be unsafe for parallelization, wherein determining that the particular cell from the subsequence is unsafe for parallelization comprises, determining that the executable code of the particular cell invokes a function from the list of functions.

5. The method of claim 1, wherein the executable code of cells of the subsequence comprises programming language instructions, wherein determining that the particular cell from the subsequence is unsafe for parallelization comprises, determining that the executable code of the particular cell invokes a function that uses a global dictionary of variables.

6. The method of claim 1, wherein the second cell depends on execution of the first cell if the second cell receives as input, a value that is output by the first cell.

7. The method of claim 1, further comprising:

receiving a request to execute a given cell from the sequence of cells;

traversing the directed acyclic graph to identify a subset of cells on which the execution of the given cell depends;

executing the subset of cells based on the order specified by the directed acyclic graph; and executing the given cell based on values determined based on execution of the subset of cells.

8. The method of claim 1, further comprising:

receiving a request to modify code of a given cell;

determining changes to inputs and outputs of the given cell based on modification of the given cell;

modifying the directed acyclic graph based on the changes to inputs and outputs of the given cell, the modifying causing one or more of: adding a new edge or deleting an existing edge; and responsive to receiving subsequent requests to execute the given cell, traversing the modified directed acyclic graph to identify a given set of cells for execution of the given cell.

9. The method of claim 1, wherein a target cell processes outputs generated by a source cell, the method further comprising:

transforming code of the target cell to include code of the source cell, such that the transformed code generates output matching output of the target cell prior to transformation; and optimizing code of the transformed target cell, such that execution of the transformed target cell is more efficient compared to execution of the target cell prior to transformation.

10. A non-transitory computer-readable medium comprising memory with instructions encoded thereon that, when executed, cause one or more computer processors to perform operations to:

receive via a user interface, a sequence of cells, wherein cells of the sequence of cells comprise executable code, wherein at least some of the cells of the sequence of cells have one or more of an input or an output;

generate based on the cells of the sequence of cells, a directed acyclic graph comprising an edge from a first cell to a second cell if the second cell depends on execution of the first cell, the generating comprising:

identifying a subsequence of cells belonging to the sequence of cells;

determining that a particular cell from the subsequence is unsafe for parallelization; and introducing at least one of (1) an edge from a cell of the subsequence that occurs before the particular cell to the particular cell, or (2) an edge from the particular cell to a cell of the subsequence that occurs after the particular cell; and execute the cells of the sequence of cells in an order determined by the directed acyclic graph, wherein a plurality of cells is executed in parallel responsive to each cell of the plurality of cells being unreachable from remaining of the plurality of cells by following edges of the directed acyclic graph.

11. The non-transitory computer-readable medium of claim 10, wherein the executable code of cells of the subsequence comprises database query statements, wherein determining that the particular cell from the subsequence is unsafe for parallelization comprises, determining that the executable code of the particular cell comprises one or more of insert, update, or delete operation.

12. The non-transitory computer-readable medium of claim 10, wherein the executable code of cells of the subsequence comprises database query statements, wherein determining that the particular cell from the subsequence is unsafe for parallelization comprises, determining that the executable code of the particular cell comprises an alter table operation.

13. The non-transitory computer-readable medium of claim 10, wherein the executable code of cells of the subsequence comprises database query statements, wherein the instructions further cause the one or more computer processors to:

store a list of functions determined to be unsafe for parallelization, wherein instructions to determine that the particular cell from the subsequence is unsafe for parallelization determine that the executable code of the particular cell invokes a function from the list of functions.

14. The non-transitory computer-readable medium of claim 10, wherein the executable code of cells of the subsequence comprises programming language instructions, wherein determining that the particular cell from the subsequence is unsafe for parallelization comprises, determining that the executable code of the particular cell invokes a function that uses a global dictionary of variables.

15. The non-transitory computer-readable medium of claim 10, wherein instructions for determining that the second cell depends on execution of the first cell comprises, determining that the second cell receives as input a value that is output by the first cell.

16. The non-transitory computer-readable medium of claim 10, wherein the instructions further cause the one or more computer processors to:

receive a request to execute a given cell from the sequence of cells;

traverse the directed acyclic graph to identify a subset of cells on which the execution of the given cell depends;

execute the subset of cells based on the order specified by the directed acyclic graph; and execute the given cell based on values determined based on execution of the subset of cells.

17. The non-transitory computer-readable medium of claim 10, wherein the instructions further cause the one or more computer processors to:

receive a request to modify code of a given cell;

determine changes to inputs and outputs of the particular cell based on modification of the given cell;

modify the directed acyclic graph based on the changes to inputs and outputs of the given cell, the modifying causing one or more of: adding a new edge or deleting an existing edge; and responsive to receiving a subsequent request to execute the given cell, traverse the modified directed acyclic graph to identify a given set of cells for execution of the given cell.

18. The non-transitory computer-readable medium of claim 10, wherein a target cell processes outputs generated by a source cell, wherein the instructions further cause the one or more computer processors to:

transform code of the target cell to include code of the source cell, such that the transformed code generates output matching output of the target cell prior to transformation; and optimize code of the transformed target cell, such that execution of the transformed target cell is more efficient compared to execution of the target cell prior to transformation.

19. A computer system comprising:

one or more computer processors; and a non-transitory computer-readable medium comprising memory with instructions encoded thereon that, when executed, cause the one or more computer processors to perform operations to:

receive via a user interface, a sequence of cells, wherein cells of the sequence of cells comprise executable code, wherein at least some of the cells of the sequence of cells have one or more of an input or an output;

generate based on the cells of the sequence of cells, a directed acyclic graph comprising an edge from a first cell to a second cell if the second cell depends on execution of the first cell, the generating comprising:

identifying a subsequence of cells belonging to the sequence of cells;

determining that a particular cell from the subsequence is unsafe for parallelization; and introducing at least one of (1) an edge from a cell of the subsequence that occurs before the particular cell to the particular cell, or (2) an edge from the particular cell to a cell of the subsequence that occurs after the particular cell; and execute the cells of the sequence of cells in an order determined by the directed acyclic graph, wherein a plurality of cells is executed in parallel responsive to each cell of the plurality of cells being unreachable from remaining of the plurality of cells by following edges of the directed acyclic graph.

20. The computer system of claim 19, wherein the instructions further cause the one or more computer processors to:

receive a request to modify code of a given cell;

determine changes to inputs and outputs of the given cell based on modification of the particular cell;

modify the directed acyclic graph based on the changes to inputs and outputs of the given cell, the modifying causing one or more of: adding a new edge or deleting an existing edge; and responsive to receiving subsequent request to execute the given cell, traverse the modified directed acyclic graph to identify set of cells for execution of the given cell.

* * * * *